(12) United States Patent
Piper

(10) Patent No.: US 9,792,525 B2
(45) Date of Patent: *Oct. 17, 2017

(54) SYSTEMS AND METHODS FOR CONTOURING A SET OF MEDICAL IMAGES

(71) Applicant: MIM Software Inc., Cleveland, OH (US)

(72) Inventor: Jonathan William Piper, Cleveland Heights, OH (US)

(73) Assignee: MIM SOFTWARE INC., Cleveland, OH (US)

( * ) Notice: Subject to any disclaimer, the term of this patent is extended or adjusted under 35 U.S.C. 154(b) by 117 days.

This patent is subject to a terminal disclaimer.

(21) Appl. No.: 14/457,316

(22) Filed: Aug. 12, 2014

(65) Prior Publication Data

US 2014/0369585 A1    Dec. 18, 2014

Related U.S. Application Data

(63) Continuation of application No. 12/772,377, filed on May 3, 2010, now Pat. No. 8,805,035.

(51) Int. Cl.
*G06K 9/00* (2006.01)
*G06K 9/62* (2006.01)
*G06T 7/12* (2017.01)
*G06T 7/174* (2017.01)

(52) U.S. Cl.
CPC ............. *G06K 9/6207* (2013.01); *G06T 7/12* (2017.01); *G06T 7/174* (2017.01); *G06T 2207/10072* (2013.01); *G06T 2207/30004* (2013.01)

(58) Field of Classification Search
None
See application file for complete search history.

(56) References Cited

U.S. PATENT DOCUMENTS

| 5,365,599 | A | 11/1994 | Seto et al. |
| 6,031,935 | A | 2/2000 | Kimmel |
| 6,396,939 | B1 | 5/2002 | Hu et al. |
| 6,445,819 | B1 | 9/2002 | Kinjo |
| 7,158,692 | B2 | 1/2007 | Chalana et al. |
| 7,505,037 | B2 | 3/2009 | Wang |
| 7,620,226 | B2 | 11/2009 | Unal et al. |

(Continued)

OTHER PUBLICATIONS

Koompairojn, Soontharee, Semi-Automatic Segmentation and Volume Determination of Bran Mass-Like Lesion, 21 st IEEE International Symposium on Computer-Based Medical Systems.

(Continued)

*Primary Examiner* — Randolf I Chu
(74) *Attorney, Agent, or Firm* — Tucker Ellis LLP; Evan Perry

(57) ABSTRACT

Systems and methods are provided for contouring a set of medical images. Deformation field data is generated between a source image and a target image of the set of medical images. The deformation field data relates structures in the source image to corresponding structures in the target image and is generated in accordance with a deformable registration algorithm. The deformation field data is utilized to generate target contour data associated with the target image from source contour data, associated with the source image, that identifies one or more objects within the source image.

27 Claims, 14 Drawing Sheets

(56) References Cited

U.S. PATENT DOCUMENTS

| | | | |
|---|---|---|---|
| 7,689,021 B2 | 3/2010 | Shekhar et al. | |
| 8,270,696 B2 | 9/2012 | Udupa et al. | |
| 8,805,035 B2 * | 8/2014 | Piper | G06K 9/6207 |
| | | | 345/619 |
| 8,867,812 B2 * | 10/2014 | Li | A61B 5/055 |
| | | | 382/128 |
| 2005/0084178 A1 | 4/2005 | Lure et al. | |
| 2007/0116334 A1 | 5/2007 | Fidrich et al. | |
| 2007/0116335 A1 | 5/2007 | Capolunghi et al. | |
| 2008/0009707 A1 | 1/2008 | Theriault | |
| 2009/0016612 A1 | 1/2009 | Lobregt et al. | |
| 2009/0080731 A1 | 3/2009 | Krishnapuram et al. | |
| 2009/0080738 A1 * | 3/2009 | Zur | G06T 7/0085 |
| | | | 382/131 |
| 2009/0190809 A1 | 7/2009 | Han et al. | |
| 2009/0252395 A1 * | 10/2009 | Chan | A61B 6/466 |
| | | | 382/131 |
| 2010/0014099 A1 | 1/2010 | Christoph et al. | |
| 2010/0045663 A1 | 2/2010 | Chen et al. | |
| 2010/0053208 A1 * | 3/2010 | Menningen | A61B 6/037 |
| | | | 345/619 |
| 2011/0103654 A1 | 5/2011 | Lavoie et al. | |

OTHER PUBLICATIONS

Schenk, Andrea, Efficient Semiautomatic Segmentation of 3D Objects in Medical Images; MeVis-Center for Medical Diagnostic Systems and Visualization.

* cited by examiner

SYSTEMS AND METHODS FOR CONTOURING A SET OF MEDICAL IMAGES

CROSS-REFERENCE TO RELATED APPLICATIONS

This application is a continuation of U.S. patent application Ser. No. 12/772,377, filed May 3, 2010, entitled "SYSTEMS AND METHODS FOR CONTOURING A SET OF MEDICAL IMAGES". The entirety of this application is incorporated herein by reference.

BACKGROUND OF THE INVENTION

1. Field of the Invention

The technology described in this patent document relates generally to the field of contouring medical images.

2. Description of Related Art

Contouring is the process of identifying an object within an image by outlining or otherwise distinguishing the object from the rest of the image. Medical images, such as images acquired from CT (computed tomography), MR (magnetic resonance), US (ultrasound), or PET (positron emission tomography) scans, are regularly contoured to identify certain pieces of anatomy within the image. For example, a radiologist or oncologist may contour a medical image to identify a tumor within the image. Software tools are available to assist in this type of "manual" contouring, in which the physician uses the software to create the contour by tracing the boundary of the object or objects within the image.

Three-dimensional scans, such as CT, MRI, and PET scans, produce a series of two-dimensional (2D) image slices that together make up the 3D image. Contouring these types of 3D images typically requires individually contouring each of the 2D images slices, which can be a laborious process. There is therefore a need for improved automation techniques for contouring 2D images slices to generate a 3D contour.

BRIEF SUMMARY OF THE INVENTION

In accordance with the teachings described herein, systems and methods are provided for contouring a set of medical images. An example system may include an image database, an image deformation engine and a contour transformation engine. The image database may be used to store a set of medical images. The image deformation engine may be configured to receive a source image and a target image from the set of medical images in the image database, and further configured to use a deformation algorithm with the source image and the target image to generate deformation field data that is indicative of changes between one or more objects from the source image to the target image. The contour transformation engine may be configured to receive source contour data that identifies the one or more objects within the source image, and further configured to use the deformation field data and the source contour data to automatically generate target contour data that identifies the one or more objects within the target image. The image deformation engine and the contour transformation engine may comprise software instructions stored in one or more memory devices and executable by one or more processors.

An example method of contouring a set of medical images may include the following steps: receiving a source image from the set of medical images and source contour data associated with the source image, the source contour data identifying one or more objects within the source image; receiving instructions identifying a target image in the set of medical images to contour; using a deformation algorithm to generate deformation field data from the source image and the target image, the deformation field data indicative of changes between the one or more objects from the source image to the target image; and using the deformation field data and the source contour data to generate automatic target contour data, the automatic target contour data identifying the one or more objects within the target image.

An example method for optimizing one or more parameters in a deformation algorithm may include determining a contour accuracy metric that estimates a percentage of a target contour that is likely to be manually edited. The percentage may be calculated using statistical data generated from a training set of contours. The statistical data may include a probability density function that is generated as a function of the training set of contours. The statistical data may further include a histogram of distances between a candidate contour and a reference contour in the training set of contours. The contour accuracy metric may be generated by taking a dot product of the probability density function with the histogram.

DETAILED DESCRIPTION OF THE INVENTION

Figure 1:
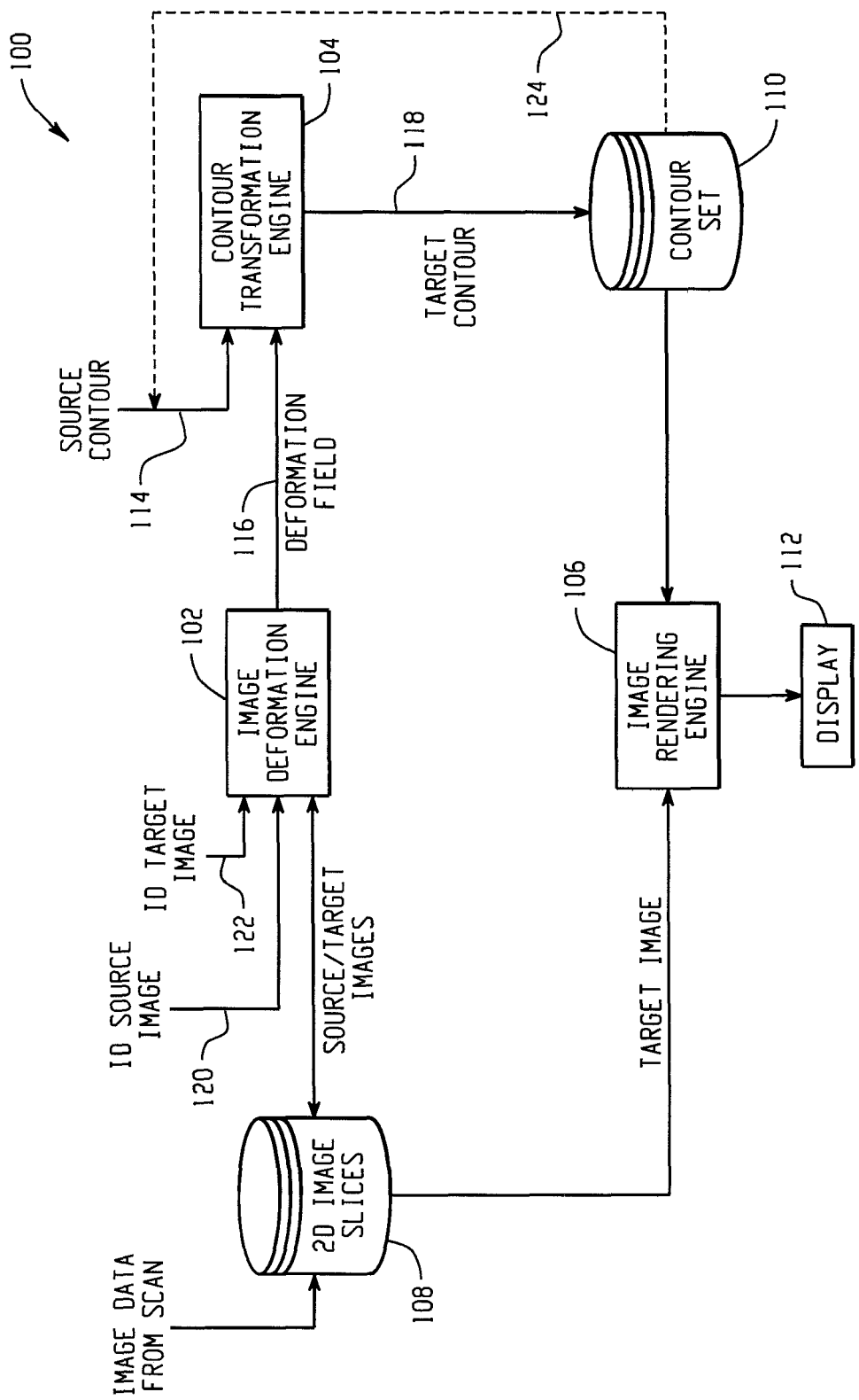
FIGS. 1, 3 and 5 depict block diagrams of example systems for contouring a set of medical images.

FIG. 1 depicts a block diagram of an example system 100 for contouring a set of medical images. The system 100 includes an image deformation engine 102, a contour transformation engine 104 and an image rendering engine 106. Also included in the example system 100 are an image database 108 for storing a set of two-dimensional image slices, a contour database 110 for storing contour data and a display 112. It should be understood that the image deformation engine, contour transformation engine and image rendering engine, as described herein, may be implemented by software instructions executing on one or more processing devices. In other implementations, however, one or more operations of these software engines may instead be performed by other known mechanisms such as firmware or even appropriately designed hardware. The image database and contour database, as described herein, may be implemented using one or more memory devices. For instance, in one example the image database and contour database may be implemented within the same memory device, and in another example they may be implanted on separate memory devices.

The plurality of medical images are loaded into the image database 108 for contouring. The plurality of medical images may include a set of two-dimensional (2D) slices that are received, for example, from a CT scanner or other system for capturing three-dimensional (3D) medical images, such that the set of 2D slices together represent a 3D medical image. In other examples, the plurality of medical images slices could be virtual, such as sagittal or coronal images (or any other slicing angle through the image data).

In operation, the system 100 receives contour data 114 for a source image in the image database 108 and automatically propagates the source contour data 114 onto a target image. Specifically, the image deformation engine 102 receives the source image and the target image from the image database 108 and applies a deformation algorithm to the source and target images to generate deformation field data 116 that indicates how one or more objects within the image have changed from the source to the target. The contour transformation engine 104 then applies the deformation field data 116 to the source contour data 114 to create target contour data 118. The target contour data 118 is then stored in the contour database 110 and may be overlaid onto the target image by the image rendering engine 106.

The image deformation engine 102 may, for example, utilize a free-form intensity-based deformable registration algorithm that maps similar tissues from the source image to the target image by matching intensity values from one image to the next. More specifically, a free-form intensity-based deformable registration algorithm is a type of deformation algorithm that generates deformation field data in the form of an x-y mapping for each pixel in the target image. For each pixel in the target image, the x-y mapping identifies the pixel in the source image that most likely corresponds to similar anatomy in the target image based on the pixel intensities. In this way, pixel positions along the edge of an object (e.g., a piece of anatomy) in the source image may be mapped to corresponding pixel positions along the edge of the same object in the target image, showing how the object (e.g., anatomy) has changed from the source image to the target image.

Free-form intensity-based deformable registrations can have configurable parameters which may be optimized to a particular registration task. These parameters include maximum number of iterations, resolution of the deformation field, smoothing of the image data, and regularization to control the smoothness of the deformation field. These parameters may, for example, be selected by the programmer or empirically optimized using training data and an optimizer, such as Amoeba, a steepest-descent algorithm, or a population-based optimizer like genetic algorithms or particle swarm optimization.

The contour transformation engine 104 takes the deformation field data 116 and applies it to the source contour data 114 in order to warp the contour data to match the changes from the source image to the target image. In this way, all of the source contour data 114, possibly including contours of multiple objects within the source image, may be transformed at the same time to generate corresponding contours 118 for the target image. In one example, the source and target contour data 114, 118 may be in the form of a binary mask that identifies pixels within a contour as a binary "1" and identifies pixels outside of a contour as a binary "0." In this example, the target contour data 118 may be generated by interpolating the source contour image (binary mask) at positions defined by the deformation field to create the target contour. In another example, multiple contours within an image could be represented by a single byte mask. Other types of contour data could also be used.

In one example, the system 100 illustrated in FIG. 1 could be used as a semi-automatic contouring tool that receives initial contour data 114 for one of the image slices in the set of images 108 and then automatically contours the remaining images slices in the set 108. In this example, the contour transformation engine 104 may receive contour data 114 for the initial source image from an external source. For instance, the initial contour data 114 may be provided by manually contouring one of the image slices 108 using one of a variety of know manual contouring software applications. In another example, the initial contour data 114 may be provided from a different set of related images, such as from a different (e.g., earlier) CT scan of the same patient. The target contour 118 for the first target slice may then be generated by applying the deformation field 116 to the provided initial source contour 114. For the remaining images in the set 108, the stored target contour data 110 may be recursively fed back as the source contour data 114 for the next image slice, as illustrated by the dotted line 124 in FIG. 1.

As shown in FIG. 1, the system 100 may also receive information identifying the current source and target slices 120, 122 on which to perform the deformation and contouring operations. This allows the user to define the order in which the image slices 108 are contoured. In operation, when a source image is identified 120, the system may determine if a corresponding source contour 114 is already stored in the contour database 110. If so, then the stored contour may be used as the source contour 114 for the identified target image 122. In other examples, source contours 114 could be input for multiple image slices in the set 108, and the user may use the source and target identifications 120, 122 to dictate which source contour is applied to which target image.

In one example, the source and target identification information 120, 122 may be supplied in the form of simple up or down commands to instruct the system 100 to move on to the next slice. In other examples, however, the target slice does not necessarily have to be the next consecutive slice after the source image. For instance, in one example, if the user identifies a target slice 122 that is not consecutive with the identified source slice 120, the contour transformation engine 104 may apply an interpolation algorithm to the source and target contour data 114, 118 to generate contour data for one or more skipped intermediary slices. In another example, the contour transformation engine 104 may generate contour data directly from a source contour to a nonadjacent target contour. In addition, the identifying information 120, 122 may enable the user to more precisely control the contouring process. For example, the user could start with a contoured source slice in the middle of the set of images 108, perform automatic contours in a first direction, and then return to the initial contoured source image and perform automatic contours in the other direction (see, e.g., FIGS. 8-12.)

Figure 2:
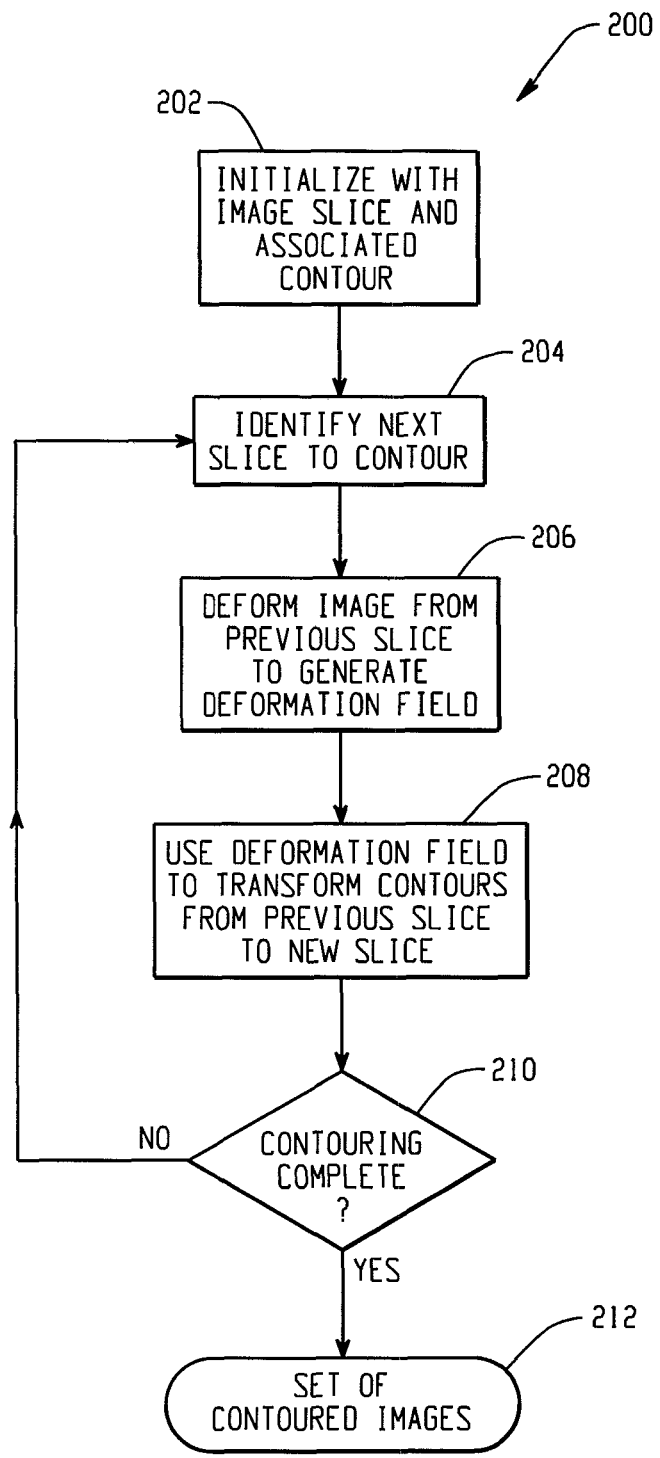
FIGS. 2, 4, 6 and 7 depict a flow diagrams of example methods for contouring a set of medical images.

FIG. 2 is a flow diagram depicting an example method of contouring a set of medical images. In step 202, an initial source image is received along with associated source contour data. The initial source image may, for example, be received from a stored set of 2D medical image slices, such as image slices from a CT scan. In other examples, the initial source image may be received from a different set of images that is related to the images to be contoured. For example, the initial source image may be from a previous CT scan of the same anatomy in the same patient or possibly from a different patient. The initial source contour data received in step 202 may, for example, be generated by manually contouring the initial source image using a manual contouring software application or automatically generated by a known auto-contouring software application. In other examples, the initial source contouring data could instead be provided from a different set of related images, such as a prior CT scan.

In step 204, a target image is identified for contouring based on the source image and source contour. The target image may, for example, be identified by a user via a graphical user interface that allows the user to select the target image from a set of image slices. In step 206, a deformation algorithm, such as an intensity-based deformable registration algorithm, is applied to the source and target images to generate deformation field data that indicates how one or more objects within the images have changed from the source image to the target image. The deformation field data is then applied to the source contour data in step 208 to automatically create contour data for the target image by transforming the source contour to match the changes from the source image to the target image.

At decision step 210, the method determines whether there are additional image slices in the set to contour. This decision may, for example, be based on input from a user or may be automatically determined by comparing the generated contour data with the set of stored image slices. If the contouring is complete, then the method proceeds to step 212 at which point a set of contoured images has been generated. Otherwise, if the contouring is not completed, then the method returns to step 204 where the next target contour is identified. When the method returns to step 204, the previous target image and contour data may be used as the source image and source contour data for automatically contouring the next identified target image. Alternatively, if the next identified target image is not consecutive with the previously contoured target image, then the source image and contour data may be selected from a database of stored images and contours or may otherwise be provided or selected by the user. In other embodiments, a non-consecutive slice may be contoured by direct deformation from the previously contoured target image or by computing and concatenating deformations pairwise through a chain of consecutive slices.

It should be understood that similar to the other processing flows described herein, one or more of the steps and the order in the flowchart may be altered, deleted, modified and/or augmented and still achieve the desired outcome.

Figure 3:
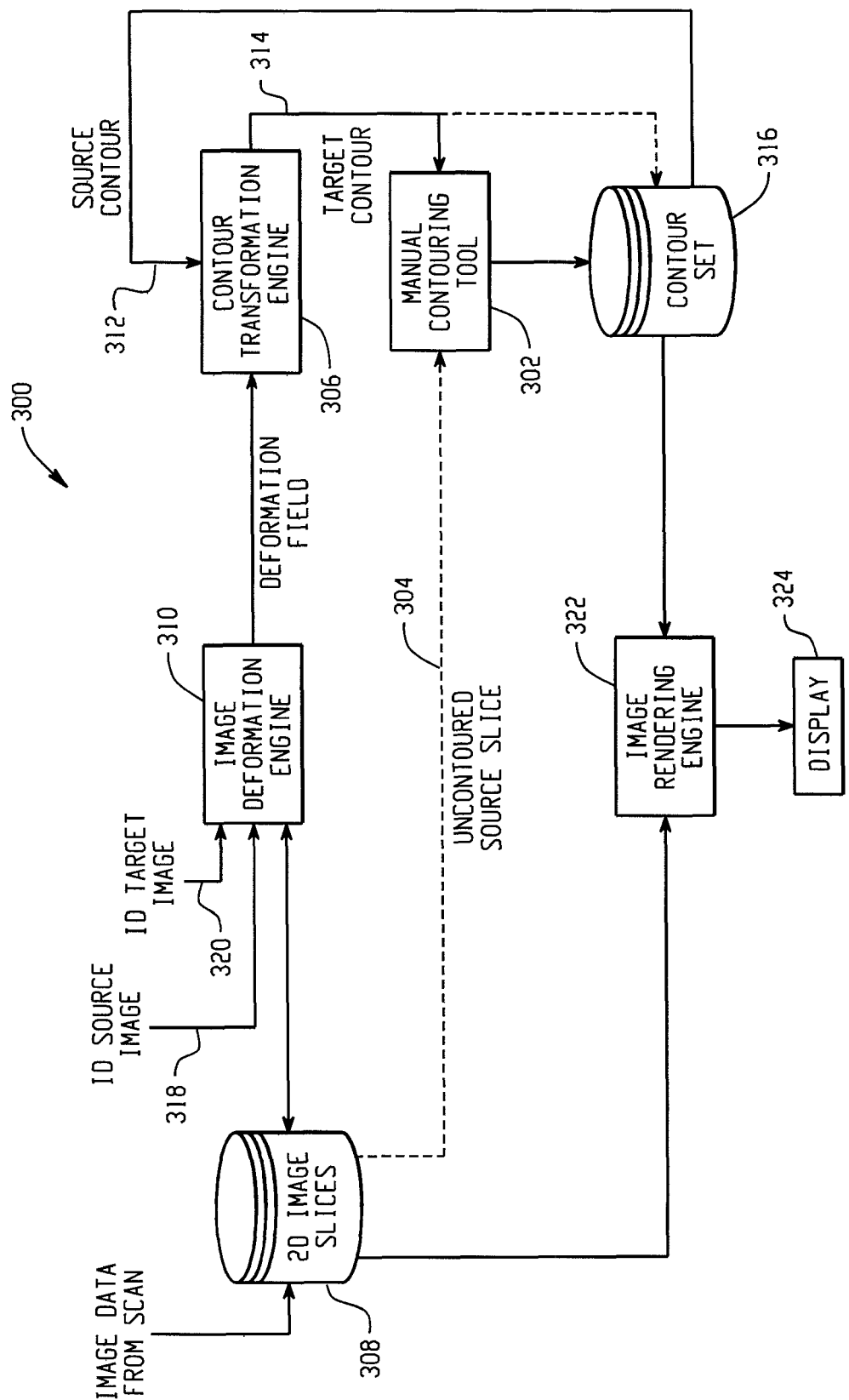

FIG. 3 depicts a block diagram of another example system 300 for contouring a set of medical images. In this example, manual contouring software 302 is included within the system 300 for manually contouring one or more source images 304 or for manually modifying the target contour data generated by the contour transformation engine 306.

In operation, a set of medical images, such as 2D image slices from a CT scan, are loaded into an image database 308 for contouring. Identified source and target images from the image database 308 are received by the image deformation engine 310, which applies a deformation algorithm to the images to generate deformation field data, as described above. The deformation field data is supplied to the contour transformation engine 306, which applies the deformation field data to a source contour 312, as described above, to automatically generate target contour data 314.

The source contour data 312 may be received from a set of previously generated contour data stored in the contour database 316. For instance, an initial source image may be manually contoured using the manual contouring software 302 and stored in the contour database 316 for use as the source contour data 312 for the initial target image. The automatically generated target contour data 314 may then be stored in the contour database 316, and may be used as the source contour 312 for a subsequent target image. In this way, a full set of images may be automatically contoured from one manually-contoured initial source image. In other examples, however, the source contour data 312 may be manually generated for more than one source image. For example, an uncontoured image 304 may be selected 318 as the source image at any point during the contouring process. When an uncontoured source image 304 is selected, the manual contouring software 302 may be used to create a contour that is stored as part of the contour set in the contour database 316 and is fed back as the source contour 312 for the identified target image 320.

In addition, the manual contouring software 302 may also be used to manually edit one or more of the automatically generated target contours 314. For instance, if the user is not satisfied with the automatically generated target contour 314, then the contour may be manually modified using the manual contouring software 302, and the manually-edited target contour data may then be stored as part of the contour set in the contour database 316.

Also illustrated in FIG. 3 is an image rending engine 322 and a display device 324. The image rendering engine 322 may be used to overlay contour data from the contour database 316 onto image data from the image database 308 for viewing on the display device 324. For instance, the image rendering engine 322 may display one or both of the selected source and target images 318, 320 on the display device, along with an overlay of the source contour data 302 on the displayed source image. Then, once the target contour 314 is generated, it may be displayed as an overlay on the target image for the user to review and possibly edit.

Figure 4:
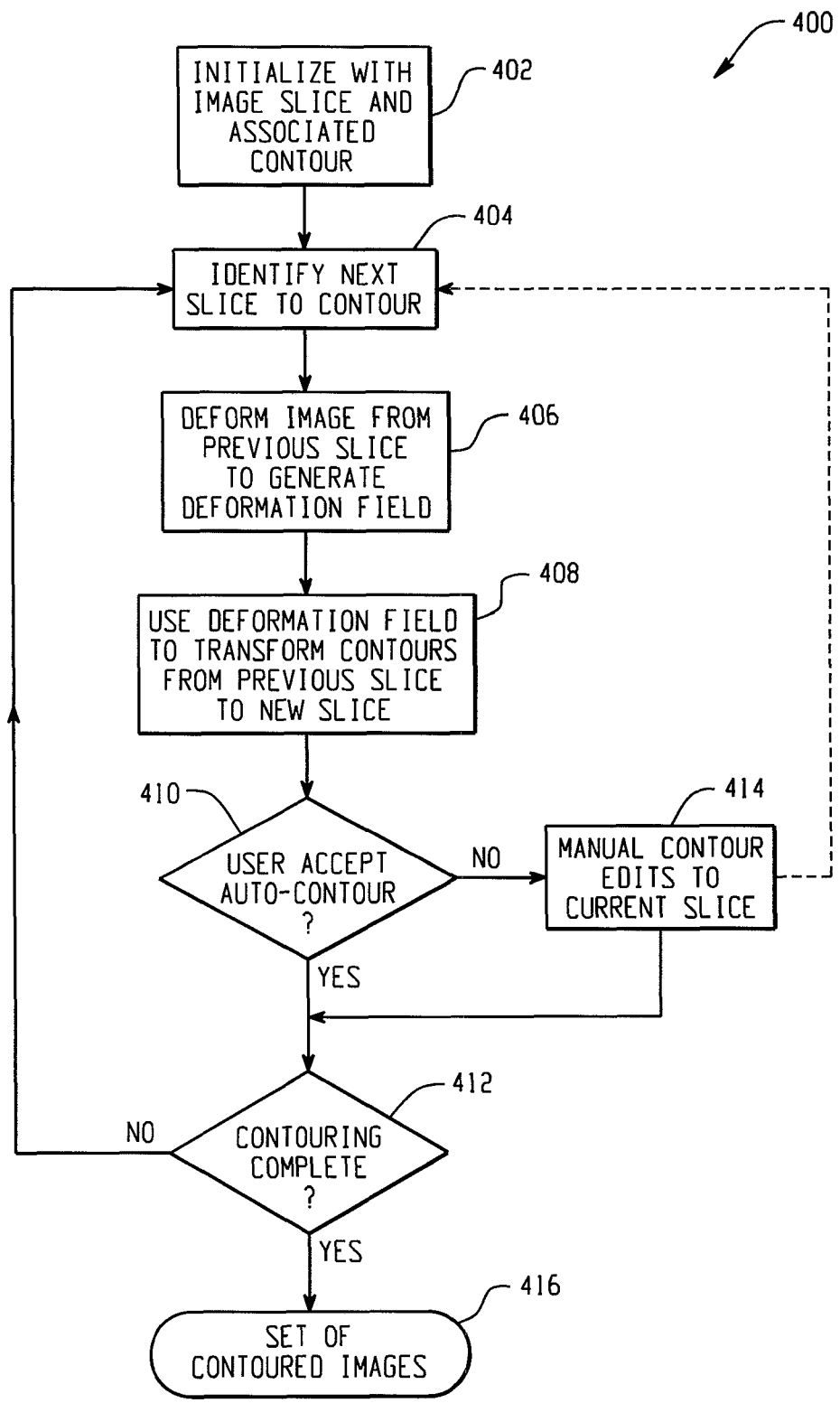

FIG. 4 is a flow diagram of another example method 400 for contouring a set of medical images. In step 402, the method is initialized with an initial source image along with associated source contour data. Then, in step 404, a target image is identified for contouring based on the source image and source contour. In step 406, a deformation algorithm is applied to the source and target images to generate deformation field data that indicates how one or more objects within the images have changed from the source image to the target image. The deformation field data is then applied to the source contour data in step 408 to automatically generate contour data for the target image by transforming the source contour to match the changes from the source image to the target image.

At decision step 410, a user input is received to either accept or modify the automatically generated target contour. If the automatically generated contour is accepted, then the method proceeds to step 412. Otherwise, if the user chooses to modify the automatically generated target contour, then the contour is manually edited at step 414 before the method proceeds to step 412. The dotted line between steps 414 and 404 signifies that if a target contour is manually edited, then during the next iteration of the contouring method (if any), the manually edited contour may be used as the source contour for the next target image.

At decision step 412, the method determines whether there are additional image slices in the set to contour. This decision may, for example, be based on input from a user or may be automatically determined by comparing the generated contour data with the set of stored image slices. If the contouring is complete, then the method proceeds to step 416 at which point a set of contoured images has been generated. Otherwise, if the contouring is not completed, then the method returns to step 404 where the next target contour is identified. When the method returns to step 404, the previous target image and contour data (automatic or manually-edited) may be used as the source image and source contour data for automatically contouring the next identified target image. Alternatively, if the next identified target image is not consecutive with the previously contoured target image, then the source image and contour data may be selected from a database of stored images and contours or may otherwise be provided or selected by the user. In other embodiments, a non-consecutive slice may be contoured by direct deformation from the previously contoured target image or by computing and concatenating deformations pairwise through a chain of consecutive slices.

Figure 5:
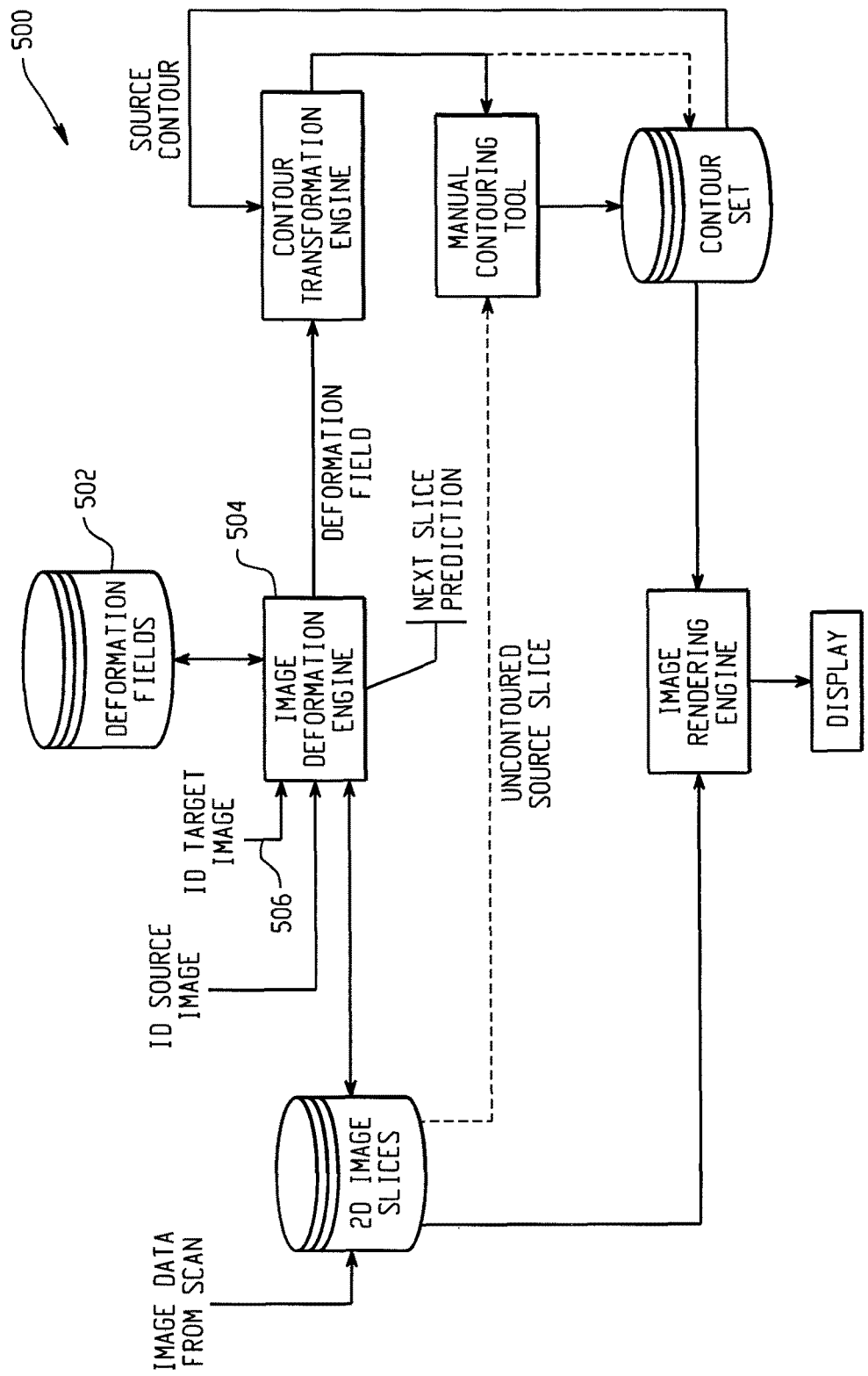

FIG. 5 is a system diagram 500 of another example system for contouring a set of medical images. This system 500 is similar to the example described above with reference to FIG. 3, except that it also includes a deformation fields database 502 for storing one or more deformation fields generated by the image deformation engine 504. In addition, in this example the image deformation engine 504 is further configured to predict the next target image that will be selected 506 for contouring. In operation, the system 500 applies a deformation algorithm to a source and target image to generate deformation field data, and then applies the deformation field data to a source contour to automatically generate a target contour, as described above with reference to FIG. 3. In addition, the image deformation engine 504 predicts the next target image that will be selected, and proceeds to generate a predicted deformation field for that next target slice, which is stored in the deformation fields database 502. Then, if the predicted target image is selected as the next target image for contouring, the already-generated deformation field may be used to transform the source contour and generate the target contour data. In this way, parallel processing capabilities of the system 500 are utilized to significantly reduce processing time.

In one example, predicted deformation field data may remain in the deformation fields database 502 until it is utilized or until the entire set of images is contoured. In this way, if the image deformation engine 504 makes a wrong prediction, then the generated deformation field data may still be available in the database 502 for later use. For instance, before generating new deformation field data, the image deformation engine 504 may first determine if deformation field data for an identified source and target image is already stored in the deformation fields database 502.

In another example, some or all of the deformation field data may be generated and stored in the deformation fields database 502 ahead of time to further reduce processing time. This solution may, for example, be advantageous when the system 500 does not have significant memory constraints.

In yet another example, the deformation field data stored in the database 502 may be used to transform contours in reverse through a deformation. For example, if a deformation field exists in the database 502 mapping image slice "A" to image slice "B", that deformation field could also be used to generate a contour for slice "A" from an existing contour of slice B.

Figure 6:
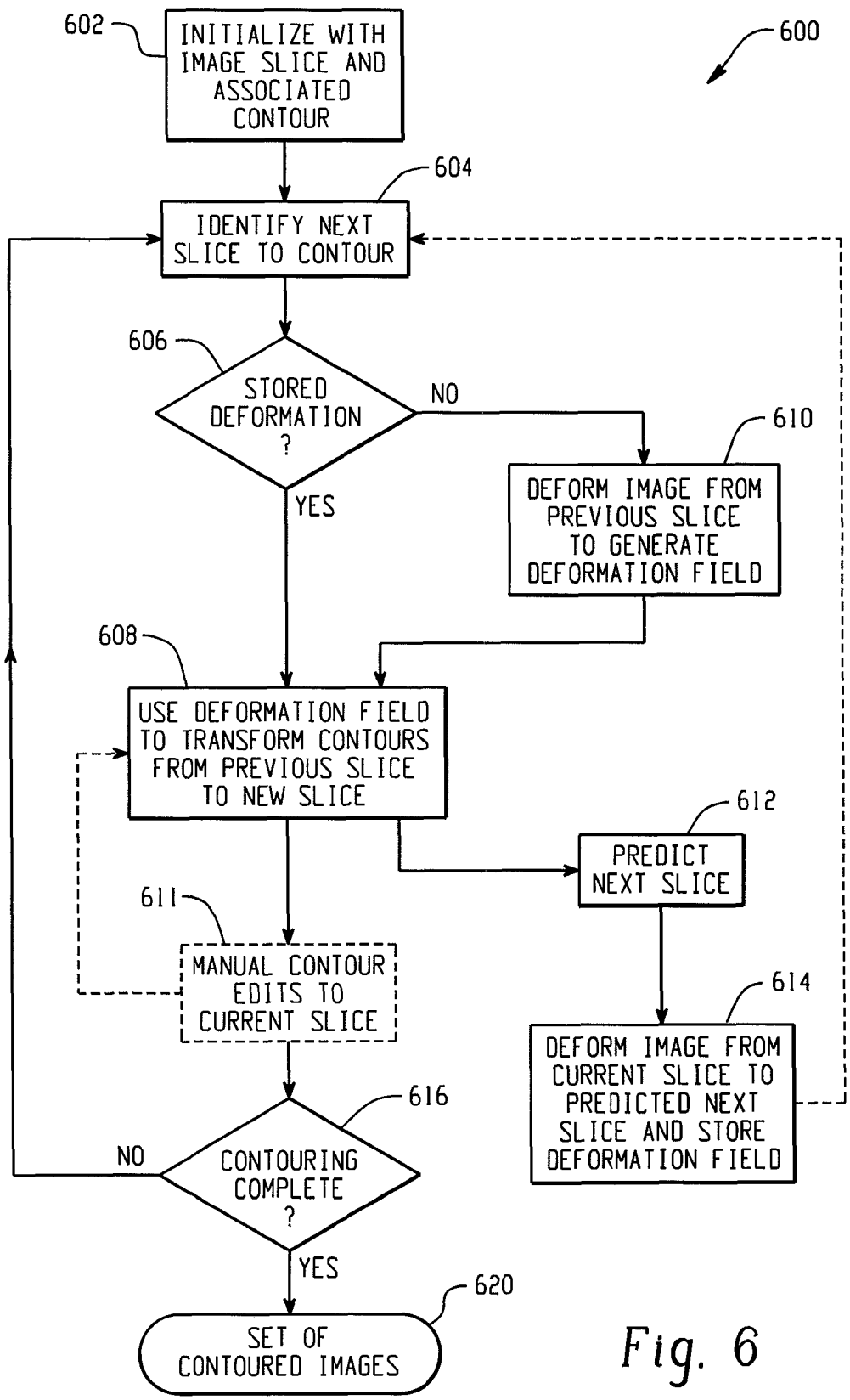

FIG. 6 is a flow diagram of another example method 600 of contouring a set of medical images. In step 602, the method is initialized with an initial source image along with associated source contour data. Then, in step 604, a target image is identified for contouring based on the source image and source contour. In decision step 606, the method determines if deformation field data has already been generated for the identified source and target images. If so, then the already-generated deformation field is retrieved and the method proceeds to step 608. Otherwise, if the deformation field data has not already been generated, a deformation algorithm is applied to the source and target images at step 610 to generate the deformation field data.

At step 608, the deformation field data is applied to the source contour data to automatically generate contour data for the target image by transforming the source contour to match the changes from the source image to the target image. The user may then manually edit the target contour data at step 611, if desired. Step 611 is illustrated with a dotted box to indicate that the user may choose to skip this step and leave the automatically generated target contour unedited. In addition, the dotted line between steps 611 and 608 signifies that if a target contour is manually edited, then during the next iteration of the contouring method (if any), the manually edited contour may be used as the source contour for the next target image.

In addition, after step 608 the method performs the parallel process of predicting the next target image at step 612. Then, in step 614, a deformation algorithm is applied to the current target image and the predicted target image to generate and store predicted deformation field data. The dotted line between steps 614 and 604 signifies that the stored predicted deformation field data from step 614 may then be used to transform a source contour in a subsequent iteration of the method.

At decision step 616, the method determines whether there are additional image slices in the set to contour. This decision may, for example, be based on input from a user or may be automatically determined by comparing the generated contour data with the set of stored image slices. If the contouring is complete, then the method proceeds to step 620 at which point a set of contoured images has been generated. Otherwise, if the contouring is not completed, then the method returns to step 604 where the next target contour is identified. When the method returns to step 604, the previous target image and contour data (automatic or manually-edited) may be used as the source image and source contour data for automatically contouring the next identified target image. Alternatively, if the next identified target image is not consecutive with the previously contoured target image, then the source image and contour data may be selected from a database of stored images and contours or may otherwise be provided or selected by the user.

Figure 7:
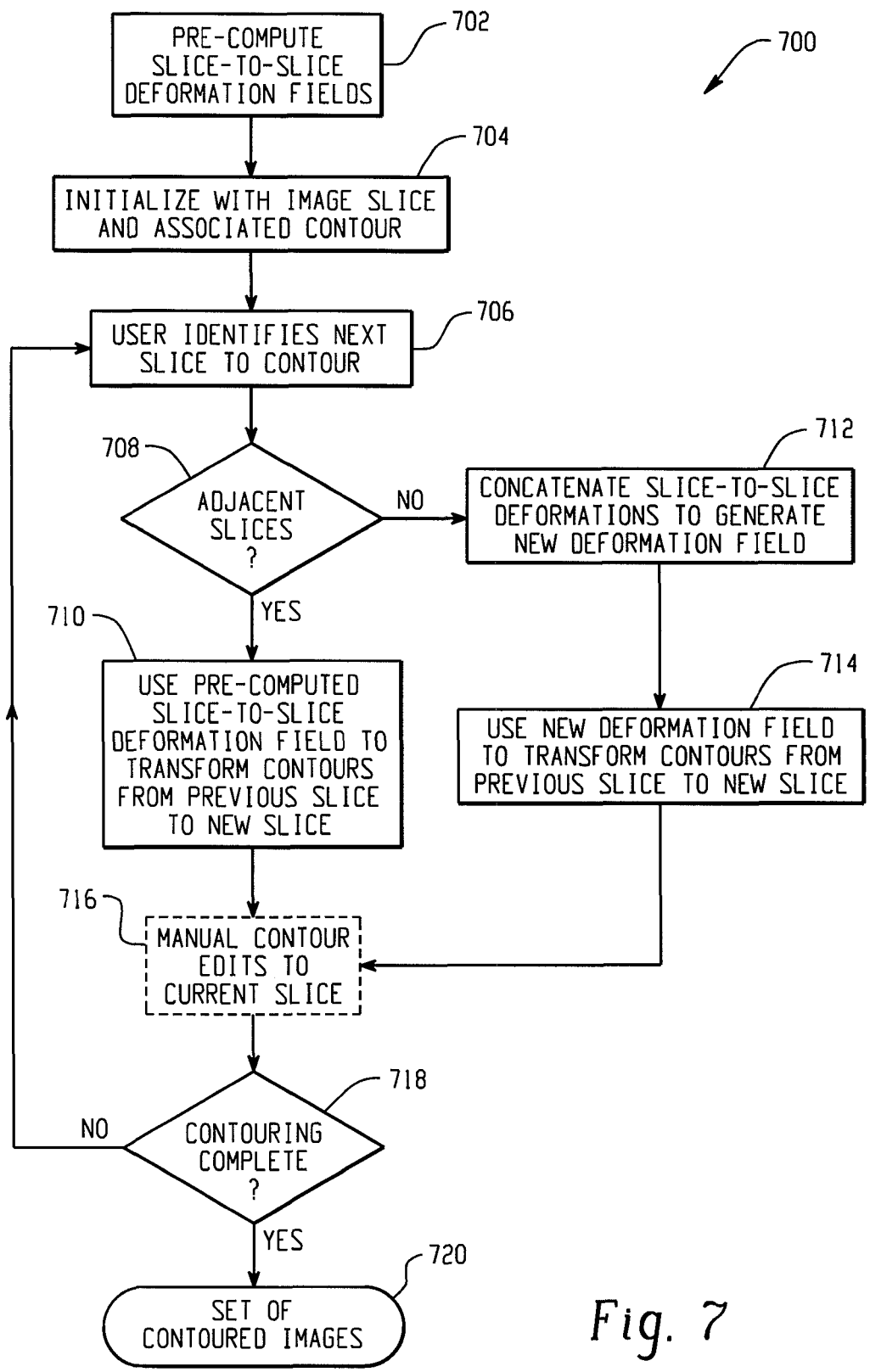

FIG. 7 is a flow diagram of an example method 700 of contouring a set of medical images using a set of pre-computed deformation fields. In step 702, a deformation field is calculated and stored for each two consecutive slices in the set of medical images. Then, at step 704, the method is initialized with an initial source image and associated source contour data. In step 706, a target image is identified for contouring based on the source image and source contour.

In step 708, the method determines whether the source and target images are adjacent slices in the set of medical images. If they are, then the method proceeds to step 710 to use the pre-computed deformation field for the two slices to transform the source contour data to generate the target contour. Otherwise, if a nonconsecutive slice is identified as the target image in step 706, then the method proceeds from decision step 708 to step 712. In step 712, the deformation field for the identified source and target images is determined by concatenating all of the pre-calculated deformation fields between the source image and the target image. Then, at step 714, this concatenated deformation field is used to transform the source contour data to generate the target contour.

In step 718, the user may manually edit the target contour data, if desired. Step 718 is illustrated with a dotted box to indicate that the user may choose to skip this step and leave the automatically generated target contour unedited. At decision step 718, the method determines whether there are additional image slices in the set to contour. This decision may, for example, be based on input from a user or may be automatically determined by comparing the generated contour data with the set of stored image slices. If the contouring is complete, then the method proceeds to step 720 at which point a set of contoured images has been generated. Otherwise, if the contouring is not completed, then the method returns to step 704 where the next target contour is identified.

Figure 8:
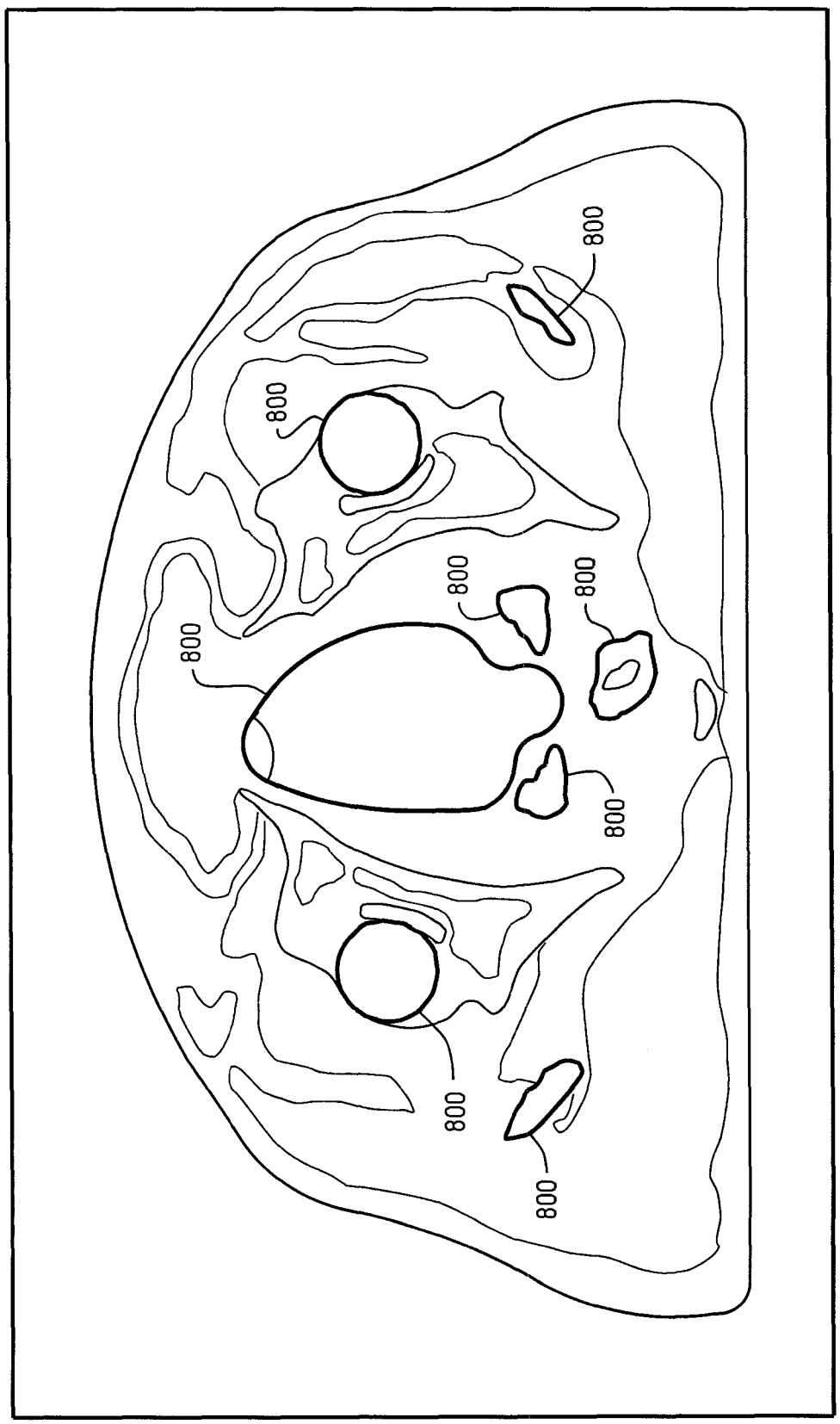
FIGS. 8-12 illustrate examples of contours that may be generated by the systems and method described herein.
Figure 9:
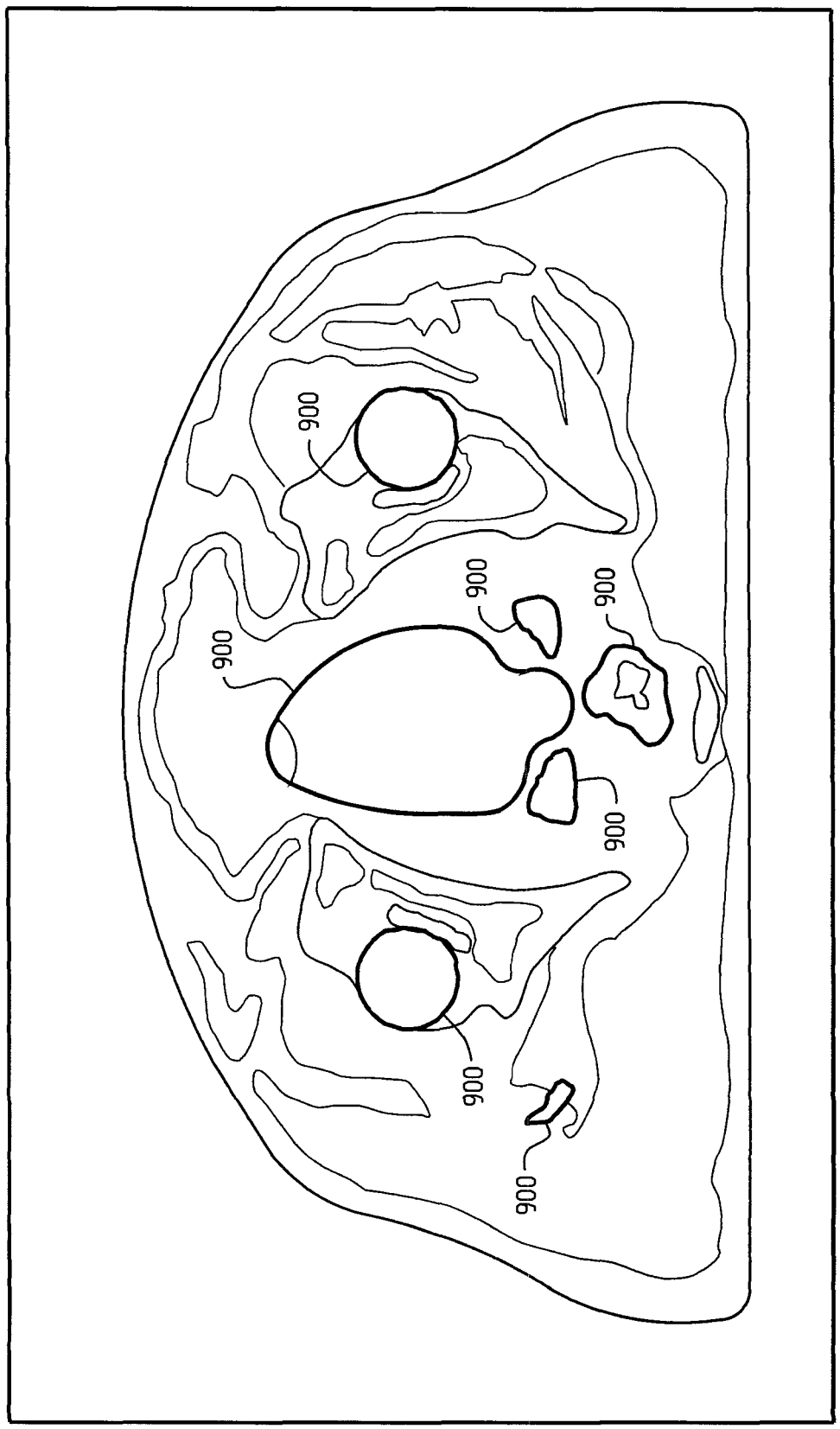

FIGS. 8-12 illustrate examples of contour data that may be generated by the systems and method described herein. Specifically, FIGS. 8-12 are illustrations of contoured image slices from a CT scan of a patients pelvic region. FIG. 8 illustrates an example of a source image that has been manually contoured to include contours 800 that identify portions of the patients left and right femur, bladder, rectum and seminal vesicles. FIG. 9 illustrates a target image that has been automatically contoured from the source image and contour data of FIG. 8 using the systems and methods described herein. A comparison of FIGS. 8 and 9 shows that changes in the patients anatomy from the image slice shown in FIG. 8 to the image slice shown in FIG. 9 are reflected in target contours 900 shown in FIG. 9.

Figure 10:
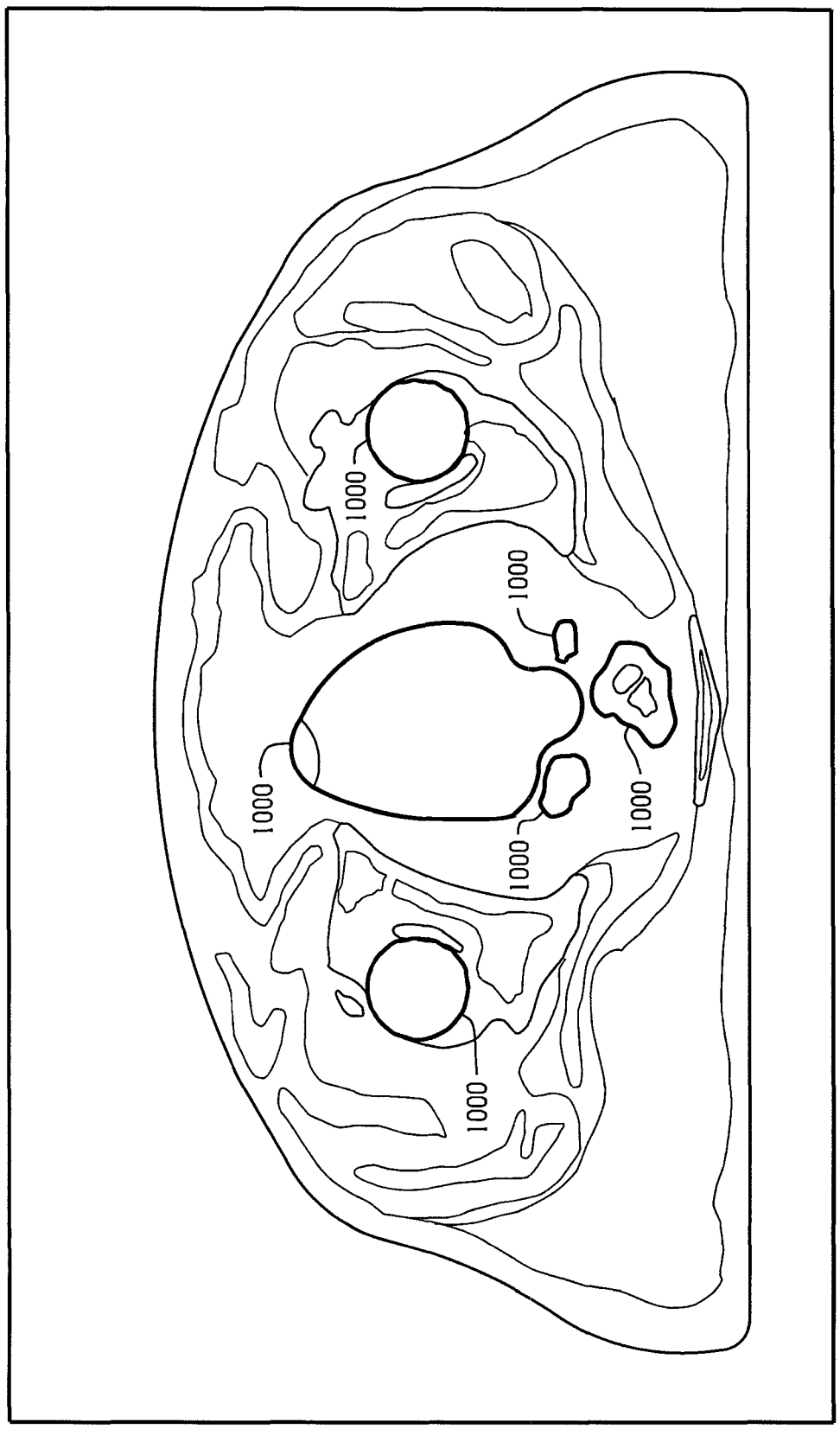

FIG. 10 illustrates a next consecutive image slice in the set of images. The contours 1000 illustrated in FIG. 10 were automatically generated by the systems and methods described herein, using the image and automatically generated contour data from FIG. 9 as the source image and contour.

Figure 11:
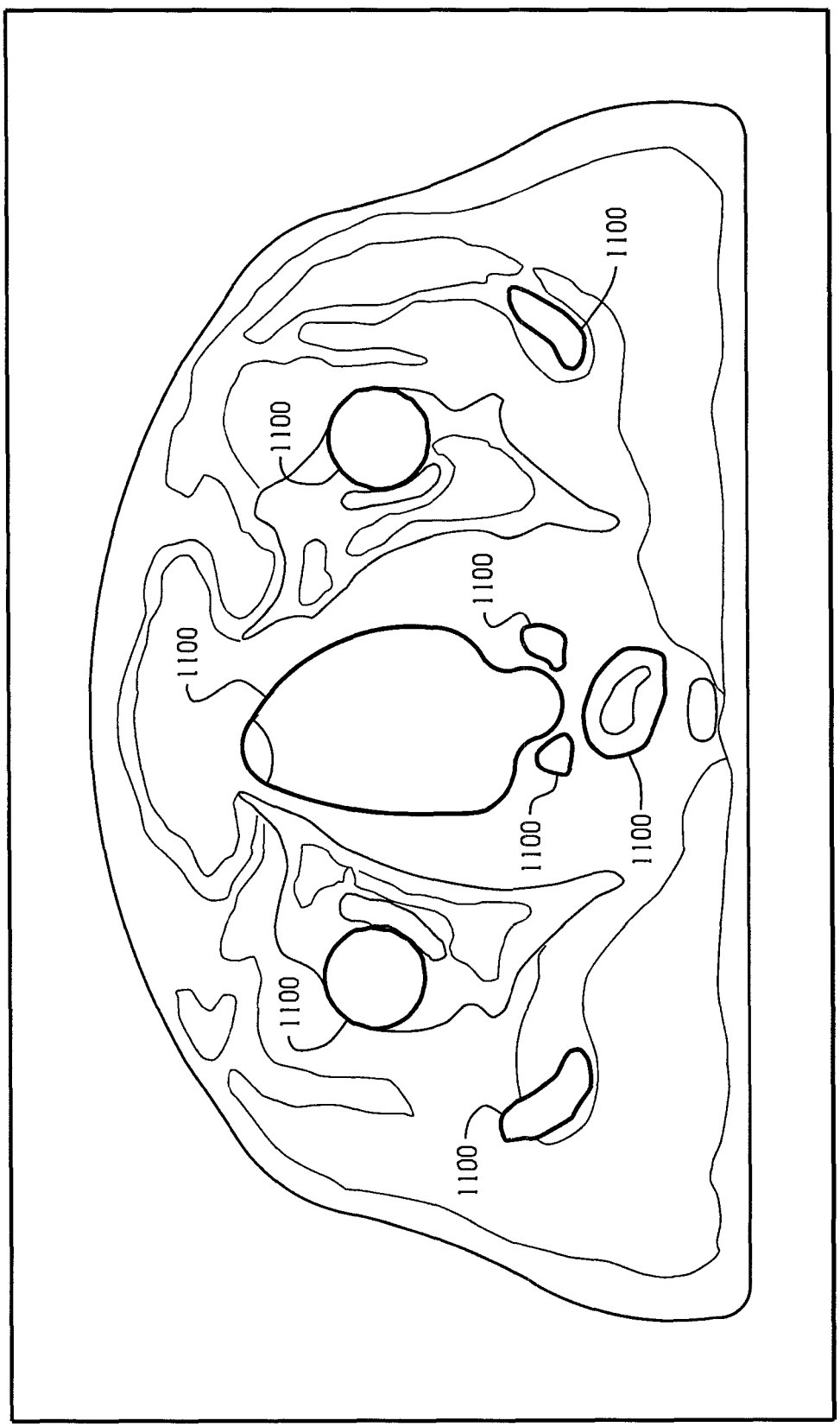

FIG. 11 illustrates an image slice that is adjacent to the image slice of FIG. 8, but in the opposite direction. That is, FIGS. 9 and 11 are both adjacent to the slice shown in FIG. 8. The contours 1100 illustrated in FIG. 11 were automatically generated using the systems and methods described herein by identifying the image and contour of FIG. 8 as the source image and contour.

Figure 12:
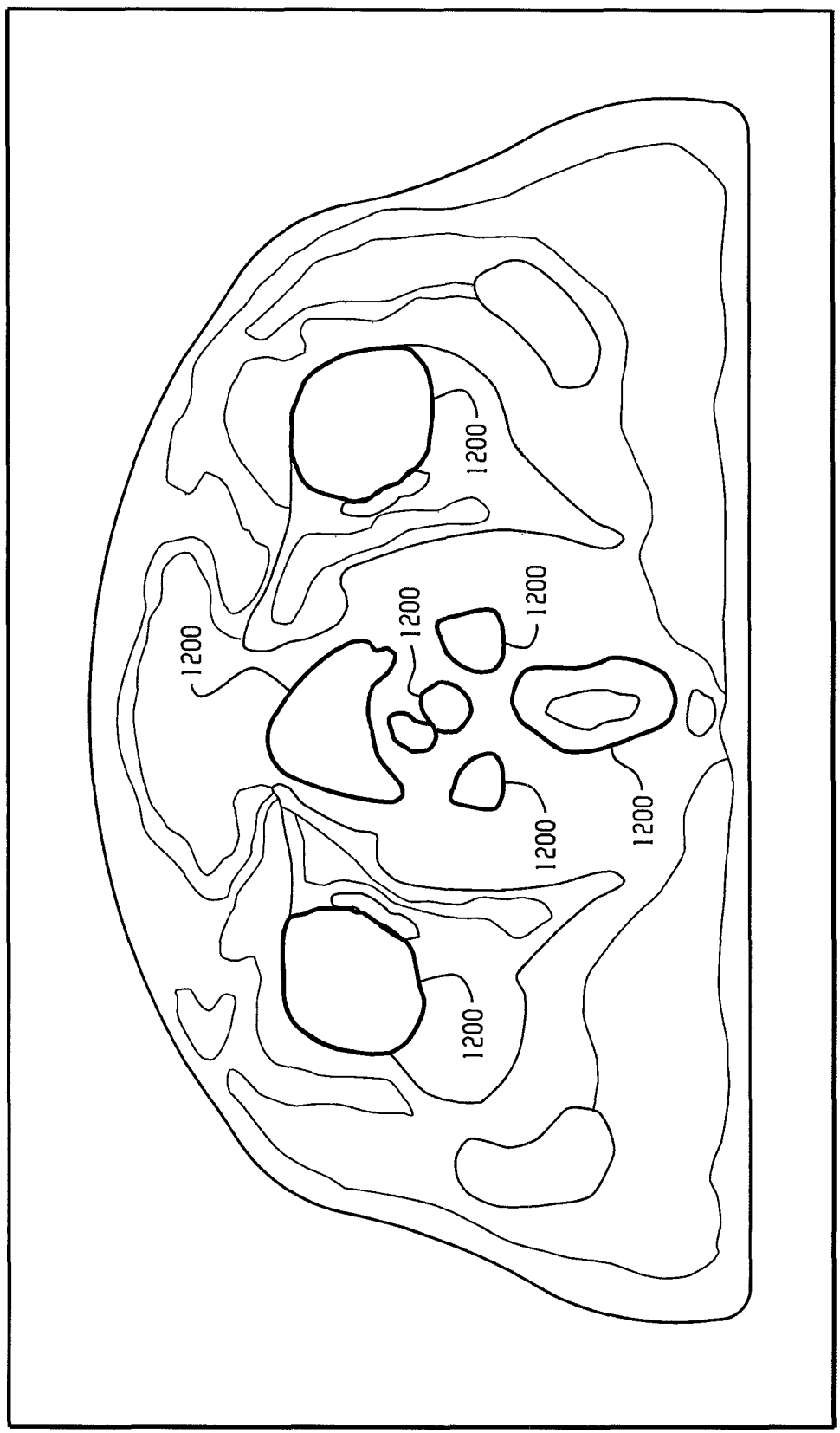

FIG. 12 illustrates an image slice from the set of images that is closest to the image shown in FIG. 11, but that is not adjacent to any of the image slices shown in FIG. 8-11. The contours 1200 shown in FIG. 12 may, for example, be generated using the systems and method described herein by selecting one of the other contoured images from FIGS. 8-11 as the source image and contour, even though the images are not adjacent.

Deformable registration algorithms, such as the deformation algorithm utilized by the systems and methods described above, may include parameters that can be configured to optimize the registration for particular tasks. One such task is transforming contours from a source image to a target image. These images could be individual slices or 3D medical images (e.g., for atlas-based segmentation). A more specific optimization allows the system to be configured for a specific physician, institution, treatment site, image modality, camera or any combination thereof by accepting a set of manually defined contours and medical images as a training set and a contour accuracy metric for scoring the automatically or semi-automatically generated contour results. These may then be used as inputs to an optimization program to locate at least a local minimum (or maximum, depending on the metric) for the configurable parameters of the deformable registration algorithm.

Figure 14:
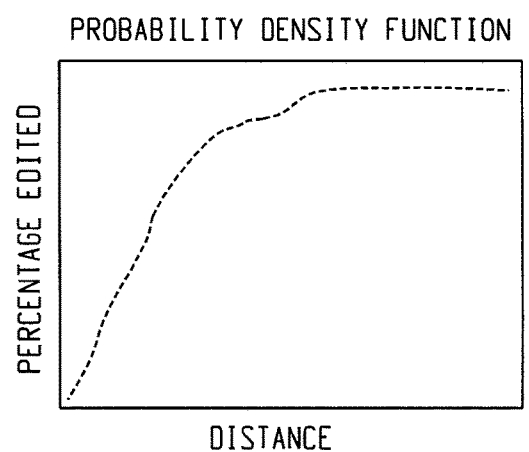
Figure 15:
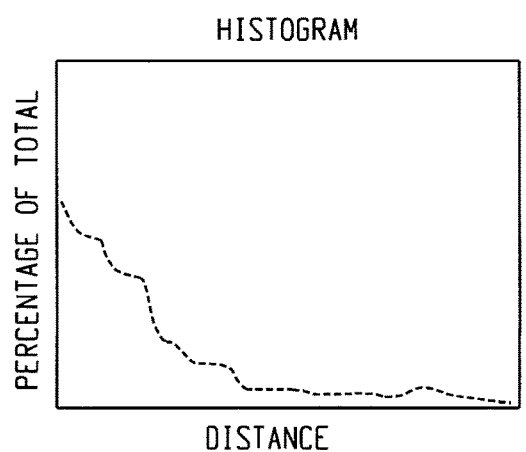

The contour accuracy metric could be any number of known metrics for contour accuracy, such as mean distance of contour surfaces, or Dice's Similarity Coefficient. Or it could be based on an estimate of the percentage of the contour which the user is likely to edit. This metric may, for example, be computed by taking the dot product of a probability density function and a histogram of distances between the automatically generated contour and a reference contour, as illustrated in FIGS. 13-15.

Figure 13A:
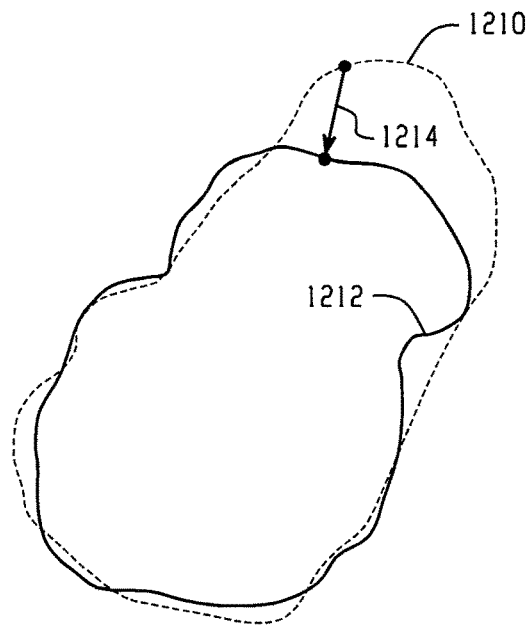
FIGS. 13A, 13B, and 14-15 illustrate an example process for optimizing a deformation algorithm for a particular scenario.
Figure 13B:
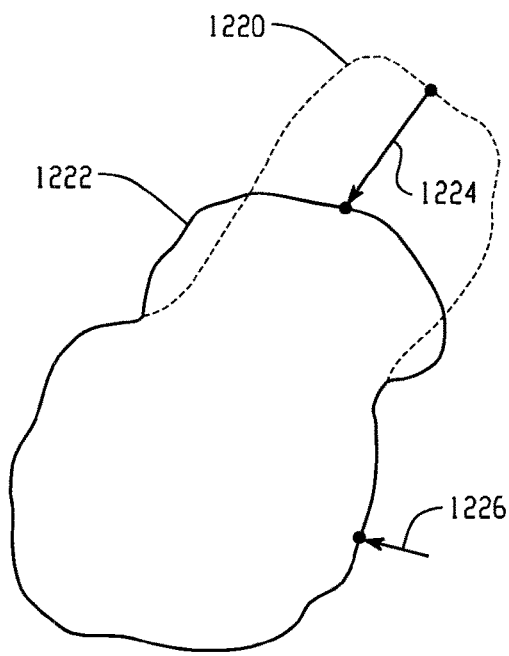

As shown in FIGS. 13A and 13B, the training set of contours may include a plurality of contours for the same image. For example, the plurality of contours in the training set may include a set of automatically generated contours, as illustrated by contour 1212 in FIG. 13A and contour 1222 in FIG. 13B. The training set may also include manual edits to an automatically generated contour set, as illustrated by the dotted contour segment 1220 in FIG. 13B. In addition, the training set may include a reference contour, such as a single manually defined contour, as illustrated by the dotted contour 1210 in FIG. 13A, or a consensus contour created from a multiplicity of contour sets.

Distances may be computed between points sampled along the automatically generated contours 1212, 1222 and the corresponding points on the manually edited contour 1220 to determine whether the point was manually edited or left unedited. In the examples shown in FIGS. 13A and 13B, distance measurements are illustrated by the arrows 1214, 1224 and 1226. Distance measurements greater than zero signify that the automatically generated contour segment was edited, as illustrated by arrow 1324. Distance measurements of zero signify that the automatically generated contour segment was left unedited, as illustrated by arrow 1226. In addition, the distances of each point on the automatically generated contour 1212, 1222 and the corresponding point on the reference contour 1210 can be calculated, as illustrated by arrow 1214. The combination of these distances may provide a probability density function of the likelihood that a point on the contour will be edited based on the distance of that point from the reference contour. In addition, the probability density function may be weighted based on the distance that the user moved the point during manual editing in order to penalize points far away from the reference contour. An example probability density function is illustrated in FIG. 14.

During the optimization process, contours may be automatically generated in accordance with the given configuration of the deformable registration parameters. Distances can be computed between points sampled along the automatically generated contour and the corresponding points on the reference contour. These distances can be summarized in the form of a histogram, as illustrated in FIG. 15, where each bin in the histogram corresponds to the percentage of total points on the surface of the automatically generated contour which is at a given distance from the reference contour. Computing the dot product of this histogram with the probability density function (FIG. 14) gives a single metric corresponding to the estimate of the percentage of points on the contour surface which the user is likely to edit.

As an example, the training set could consist of contours from a single physician at a single institution for treating a small number of patients. Using the computed probability density functions and distance histograms computed with each configuration, contour accuracy metrics may be calculated and fed into an optimizer to derive a local minimum for the configurable parameters.

Figure 16:
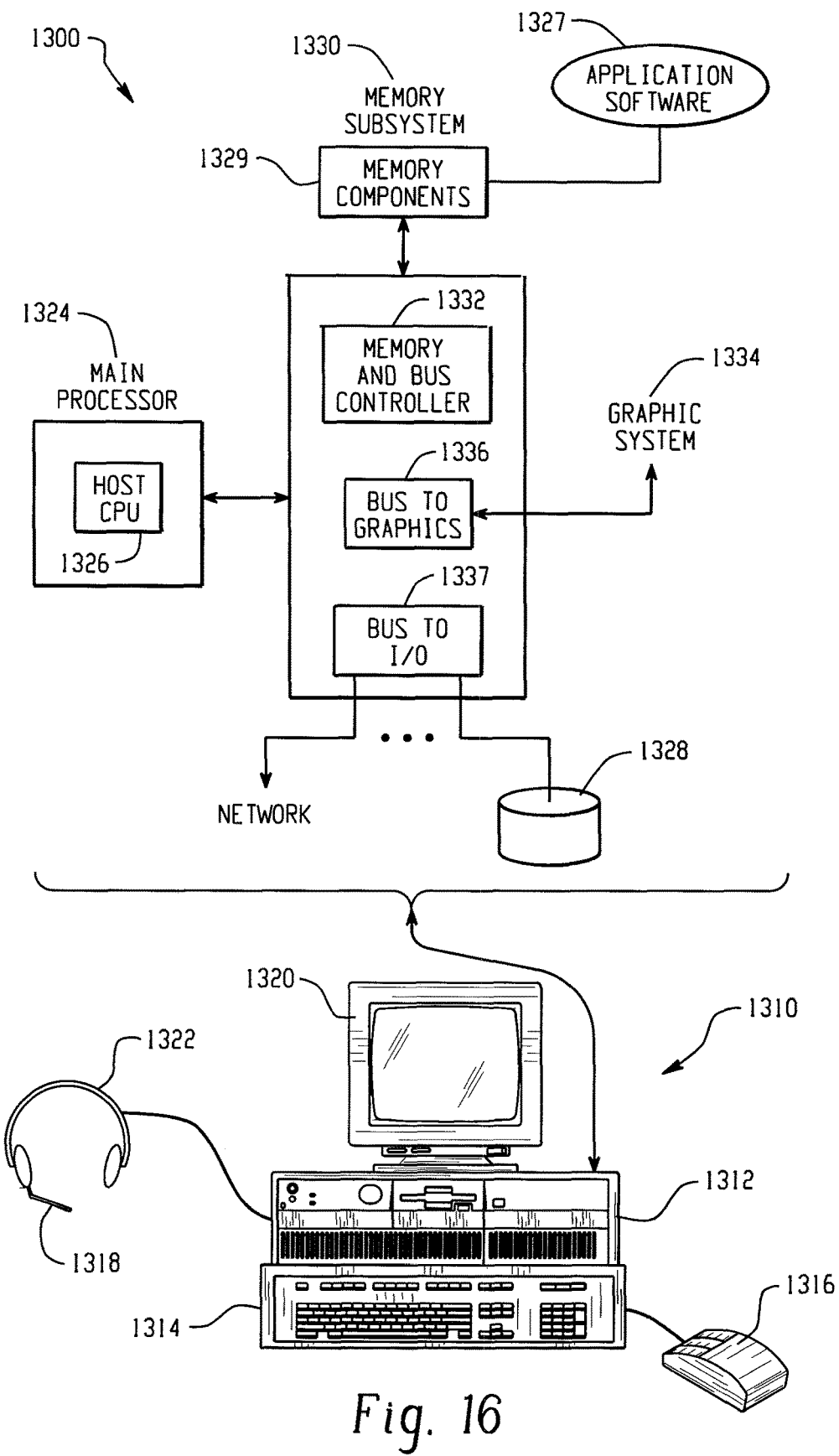
FIG. 16 is a block diagram of hardware which may be used to implement the various embodiments described herein.

FIG. 16 is a block diagram of hardware 1310 which may be used to implement the various embodiments described herein. The hardware 1310 may be a personal computer system or server system that includes a computer having as input devices keyboard 1314, mouse 1316, and microphone 1318. Output devices such as a monitor 1320 and speakers 1322 may also be provided. The reader will recognize that other types of input and output devices may be provided and that the present invention is not limited by the particular hardware configuration.

Residing within computer 1320 is a main processor 1324 which is comprised of a host central processing unit 1326 (CPU). Software applications 1327 may be loaded from, for example, disk 1328 (or other device), into main memory 1329 from which the software application 1327 may be run on the host CPU 1326. The main processor 1324 operates in conjunction with a memory subsystem 1330. The memory subsystem 1330 is comprised of the main memory 1329, which may be comprised of a number of memory components, and a memory and bus controller 1332 which operates to control access to the main memory 1329. The main memory 1329 and controller 1332 may be in communication with a graphics system 1334 through a bus 1336. Other buses may exist, such as a PCI bus 1337, which interfaces to I/O devices or storage devices, such as disk 1328 or a CDROM, or to provide network access.

This written description uses examples to disclose the invention, including the best mode, and also to enable a person skilled in the art to make and use the invention. The patentable scope of the invention may include other examples that occur to those skilled in the art.

For instance, in one alternative embodiment an atlas-based segmentation tool may be integrated with the systems and methods described above, where the atlas-based segmentation tool deformably maps images and contours to an image set in question. The atlas may also include information relating to a relationship of a particular piece of anatomy from one slice to the next. This information, along with a mapping of the atlas anatomy to the patient anatomy, may be integrated into the deformation algorithm in order to bias the deformation towards the atlas-indicated formation. For instance, if the slice-to-slice deformation in the atlas-patient shrinks the contour at the bottom of a structure, constraints to the deformation may indicate that the contour at the bottom of the same structure in the current patient should also be shrunk by the slice-to-slice deformation.

In another alternative embodiment, a more intelligent contour interpolation scheme may be used. For instance, if two non-contiguous image slices each have a contour, deformations from the contoured slices (which could be direct deformations or concatenations of a series of deformations) to the target slice may produce two candidate contours. These two candidate contours may then be averaged to define an interpolated contour which benefits from the slice-to-slice deformation described herein.

It is further noted that the systems and methods described herein may be implemented on various types of computer architectures, such as for example on a single general purpose computer or workstation, or on a networked system, or in a client-server configuration, or in an application service provider configuration.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

What is claimed is:

1. A method of contouring a three-dimensional (3D) medical image, comprising:
   receiving a source image slice, from a set of two-dimensional (2D) image slices constituting the 3D medical image, and source contour data identifying one or more objects within the source image slice;
   receiving a selection of a target image slice, from the set of the 2D image slices;
   generating deformation field data from the source image slice and the target image slice in accordance with a deformable registration algorithm, the deformation field data correlates locations in the source image slice to related locations in the target image slice; and
   generating target contour data that identifies the one or more objects within the target image slice based on the source contour data and the deformation field data.

2. The method of claim 1, further comprising generating contour data for a subset of the set of 2D image slices constituting the 3D image by:
   identifying a next target image slice in the set of 2D image slices to contour;
   generating new deformation field data correlating locations in the target image slice to related locations in the next target image slice; and
   applying the new deformation field data to the target contour data to generate new target contour data that identifies the one or more objects within the next target image slice.

3. The method of claim 2, further comprising utilizing the next target slice and new target contour data to successively generate contour data for another image slice of the sub set.

4. The method of claim 2, further comprising associating contour data of image slices in the subset to generate a 3D contour for the 3D medical image.

5. The method of claim 1, further comprising generating contour data for a second target image slice, of the set of 2D image slices, by selecting the target image slice and target contour data as a new source image slice and new source contour data, respectively.

6. The method of claim 1, wherein the source image slice and the target image slice are adjacent image slices of the 3D medical image.

7. The method of claim 1, wherein the source image slice and the target image slice are non-adjacent image slices of the 3D medical image.

8. The method of claim 7, wherein generating the deformation field data comprises directly registering the source image slice to the target image slice with the deformation algorithm.

9. The method of claim 7, wherein generating the deformation field data comprises:
generating first intermediary deformation field data between the source image slice and an intermediary image slice, the intermediary image slice being a slice of the 3D medical image located between the source image slice and the target image slice;
generating second intermediary deformation field data between the intermediary image slice and the target image slice; and
concatenating the first intermediary deformation field data and the second intermediary deformation field data to generate the deformation field data between the source image slice and the target image slice.

10. The method of claim 1, wherein the source contour data is generated with manual contouring software.

11. The method of claim 1, further comprising:
receiving user input; and
modifying the target contour data in accordance with the user input.

12. The method of claim 1, further comprising:
identifying a predicted image slice from the set of 2D image slices predicted to be contoured;
generating predictive deformation field data from the target image slice to the predicted image slice;
receiving a selection of a next target image slice from the set of 2D image slices; and
utilizing the predictive deformation field data to generate next target contour data for the next target image slice when the predicted image slice and the next target image slice are identical.

13. The method of claim 1, wherein the deformable registration algorithm is an intensity-based deformation algorithm.

14. The method of claim 13, wherein the deformation field data identifies correspondences between pixels in the source image slice and pixels in the target image slice based on pixel intensity.

15. The method of claim 1, wherein the deformable registration algorithm is a free-form deformation algorithm.

16. The method of claim 1, wherein generating the target contour data comprises identifying, with the deformation field data, pixel positions in the target image slice corresponding to pixel positions in the source image slice of the one or more objects as identified by the source contour data.

17. The method of claim 1, wherein the source contour data and the target contour data comprise respective binary mask data respectively identifying whether pixels of the source image slice and the target image slice are inside or outside the one or more objects.

18. The method of claim 1, wherein the source contour data and the target contour data comprise respective byte mask data respectively identifying whether pixels of the source image slice and the target image slice are inside or outside the one or more objects.

19. A system for contouring a 3D medical image, comprising:
at least one processor; and
a non-transitory, computer-readable storage medium having stored thereon computer-executable instructions, the computer-executable instructions comprising:
an image deformation engine configured to:
receive a source image slice and a target image slice from a set of 2D image slices constituting the 3D medical image, and
generate deformation field data from the source image slice and the target image slice in accordance with deformable registration algorithm, the deformation field data correlates locations in the source image slice to related locations in the target image slice; and
a contour transformation engine configured to:
receive source contour data identifying one or more objects within the source image slice, and
generate target contour data that identifies the one or more objects within the target image slice based on the source contour data and the deformation field data.

20. The system of claim 19, wherein the image deformation engine and the contour transformation engine are further configured to contour a second target image slice of the 3D medical image through utilization of the target image slice as a next source image slice and the target contour data as next source contour data.

21. The system of claim 20, wherein the image deformation engine and contour transformation engine iteratively contours a plurality of image slices of the 3D medical through utilization of generated target contour data as source contour data.

22. The system of claim 19, wherein the image deformation engine is further configured to predict a next image slice to be contoured and to generate predicted deformation field data between the target image slice and the next image slice predicted.

23. The system of claim 19, wherein the computer-readable storage medium further stores thereon computer-executable instructions for a manual contouring software, the manual contouring software enables manual creation of contour data or manual edits to contour data autonomously generated.

24. A non-transitory, computer-readable storage medium having stored thereon computer-executable instructions that, when executed by a computer processor, cause the computer processor to:
generate deformation field data from a source image slice and a target image slice from a set of 2D image slices constituting a 3D medical image, the deformation field data is generated in accordance with a deformable registration algorithm and correlates locations in the source image slice to related locations in the target image slice; and
generate target contour data that identifies one or more objects within the target image slice based on source contour data associated with the source image slice and the deformation field data.

25. The non-transitory, computer-readable storage medium of claim 24, further storing computer-executable instructions causing the computer processor to iteratively generate contour data for additional slices of the 3D medical image through utilization of deformation field data and contour data generated in a first iteration as a source in a next iteration.

26. The non-transitory, computer-readable storage medium of claim 25, wherein the computer-executable instructions include instructions causing the computer processor to select adjacent image slices for each iteration.

27. The non-transitory, computer-readable storage medium of claim 24, further storing computer-executable instructions causing the computer processor to obtain user input and to modify the target contour data in accordance with the user input.

* * * * *